E. SCHWARTZMAN.
MANURE FORK.
APPLICATION FILED JULY 6, 1910.

978,661.

Patented Dec. 13, 1910.

Witnesses

Edward Schwartzman,
Inventor by C. A. Snow & Co.
Attorneys

UNITED STATES PATENT OFFICE.

EDWARD SCHWARTZMAN, OF TAMPA, KANSAS.

MANURE-FORK.

978,661. Specification of Letters Patent. Patented Dec. 13, 1910.

Application filed July 6, 1910. Serial No. 570,612.

*To all whom it may concern:*

Be it known that I, EDWARD SCHWARTZMAN, a citizen of the United States, residing at Tampa, in the county of Marion and State of Kansas, have invented a new and useful Manure-Fork, of which the following is a specification.

This invention relates to forks for gathering manure and the like and its object is to provide a device of this character adapted to be drawn over the ground, the tines thereof constituting runners on which the device will travel.

Another object is to provide a fork having its tines connected in a novel manner, said fork being cheap to operate and being easily repaired should one or more of its tines become broken or otherwise rendered unfit for use.

With these and other objects in view the invention consists of certain novel details of construction and combinations of parts hereinafter more fully described and pointed out in the claims.

In the accompanying drawings the preferred form of the invention has been shown.

Figure 1:
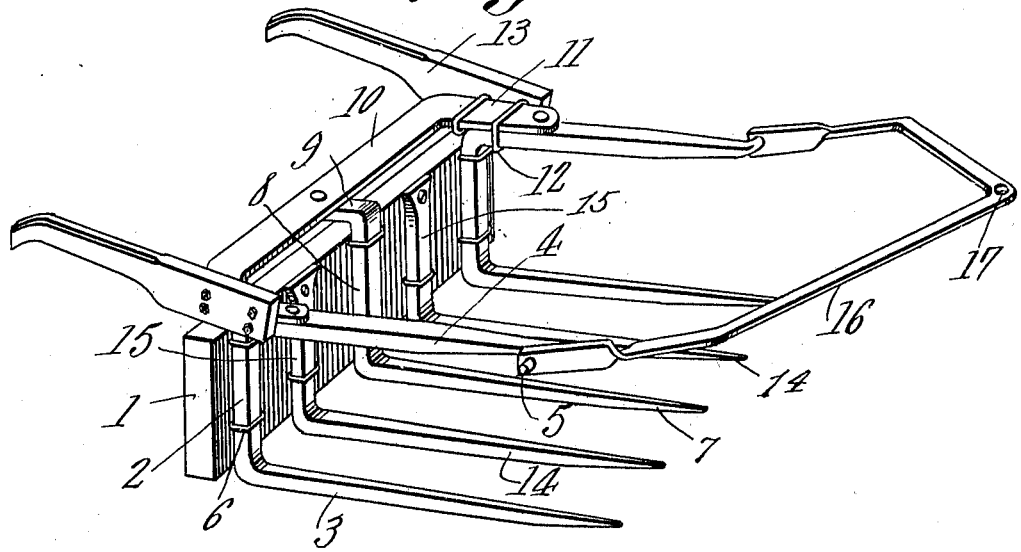
Figure 2:
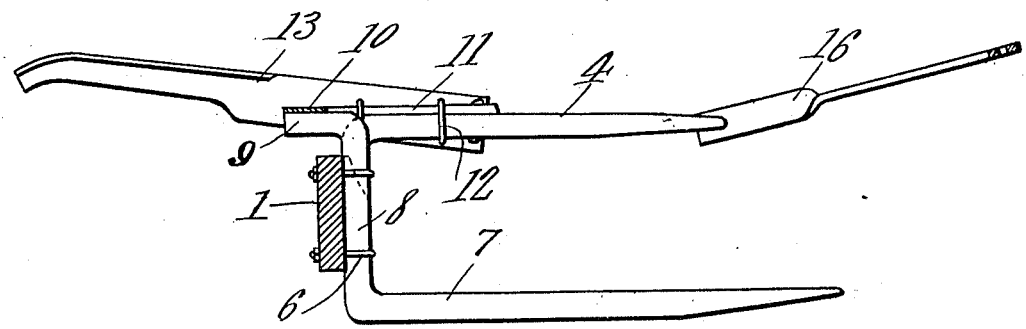

In said drawings:—Figure 1 is a perspective view of the fork. Fig. 2 is a central vertical longitudinal section therethrough.

Referring to the figures by characters of reference 1 designates a back board of wood or other suitable material and to which are secured the upstanding portions 2 of the side tines 3, these upstanding portions being provided, at their upper ends, with forwardly extending arms 4 overhanging the tines 3 and terminating in laterally extending studs 5. The upstanding portions 2 are detachably secured to the back board 1 by U-bolts 6. The central tine 7 has an upstanding portion 8 secured by means of U-bolts to the middle portion of the back-board 1, and the upper end of this upstanding portion is bent backwardly as indicated at 9 to form a support for the connecting strip 10 which is riveted or otherwise secured to this rearwardly extending portion and has forwardly extending terminals 11 bearing on the arms 4 and secured thereto by rivets or the like. U-bolts 12 extend around the forwardly extending portions 11 and also around the arms 4 and serve to secure to the arms the handles 13 which extend rearwardly from the device. Additional tines 14 are interposed between the tines 3 and 6 and each of them has an upstanding portion 15 detachably secured to the back board 1 by means of U-bolts and screws, as shown. These upstanding portions 15 do not extend above the back-board 1 but are preferably flush with the upper edge thereof.

A yoke 16 is pivotally mounted, at its ends, upon the studs 5 and an eye 17 may be formed in the center portion of the yoke so as to be engaged by a hook or the like whereby the fork can be readily drawn forward by one or more animals.

It will be seen that the points of the tines are elevated so that, as the fork is drawn forward, it glides easily over the ground. Should any one of the tines become broken or otherwise rendered unfit for further use, it can be readily detached and a new one substituted therefor. While the back board 1 is preferably formed of wood, it is to be understood that, if preferred, metal may be employed.

Various changes can of course be made in the construction and arrangement of the parts without departing from the spirit or sacrificing any of the advantages of the invention as defined in the appended claims.

What is claimed is:—

1. A fork including tines having upstanding portions, arms integral with and extending from said upstanding portions and overhanging the tines, a draft device connected to the arms, a detachable connection between the upstanding portions of said tines, and additional tines attached to said connection and carried solely thereby, all of the tines constituting runners.

2. A fork including side tines having integral upstanding portions, arms extending from said upstanding portions and integral therewith, said arms overhanging the tines, a draft device movably engaging the arms, a back board detachably secured to the upstanding portions of the tines, and additional tines having upstanding portions detachably connected to said back board.

3. A fork including side tines having upstanding portions, arms extending from and integral with said upstanding portions and overhanging the tines, said tines and arms being substantially parallel, a draft device pivotally connected to the arms, a connecting strip having forwardly extended terminals bearing upon the arms, handles, means engaging the handles for detachably securing them to the arms and for detachably securing said terminal portions to the arms, a back board detachably secured to the upstanding portions of the tines, and intermediate tines having upstanding portions detachably connected to the back board.

In testimony that I claim the foregoing as my own, I have hereto affixed my signature in the presence of two witnesses.

EDWARD SCHWARTZMAN.

Witnesses:
J. C. MEEHAN,
MARIE STEMMERMAN.